United States Patent Office 3,726,841
Patented Apr. 10, 1973

3,726,841
CROSS-LINKING POLYMERS
Joseph E. Mirolli, Beaumont, Tex., and Edwin J. Vandenberg, Foulk Woods, Wilmington, Del., assignors to Hercules Incorporated, Wilmington, Del.
No Drawing. Filed Feb. 4, 1972, Ser. No. 223,748
Int. Cl. C08g 23/06
U.S. Cl. 260—79
8 Claims

ABSTRACT OF THE DISCLOSURE

It has been found that the presence of a small amount of an aliphatic, cyclic or acyclic quaternary ammonium halide salt or tetraalkyl phosphonium halide salt enhances the cross-linking rate of polymers and copolymers of epihalohydrin when cross-linked with urea, thiourea, ammonia, various polyamines or certain heterocyclic compounds in combination with certain metal compounds.

This invention relates to a process of accelerating the cross-linking of certain polymers. More particularly, this invention relates to a process of accelerating the cross-linking of epihalohydrin polymers with halide salts of aliphatic quaternary ammonium and tetraalkyl phosphoniums.

It is known that high molecular weight polymers and copolymers of epihalohydrin can be cross-linked with urea, thiourea, ammonia, various polyamines or certain heterocyclic compounds in combination with metal compounds to produce rubbers that have numerous good attributes and can be used in diverse specialty rubber applications.

It has now unexpectedly been found that the presence of a small amount, i.e., about 1 mmol to about 300 mmol of an aliphatic, cyclic, or acylic, quaternary ammonium halide salt or tetraalkyl phosphonium halide salt per 100 grams of polymer enhances the cross-linking rate of polymers and copolymers of epihalohydrin so that cross-linking can be accomplished in much less time than it takes without the ammonium or phosphonium salts.

Any high molecular weight solid polymer, homopolymer or copolymer of an epihalohydrin as, for example, epichlorohydrin or epibromohydrin homopolymers, copolymers of two different epihalohydrins, or copolymers of an epihalohydrin with one or more other epoxides or oxetanes can be cross-linked in accordance with this invention. These polymers are readily prepared by the polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, crystalline polymers on vulcanization tending to be hard, brittle and lacking in elasticity. These properties are, of course, useful in the case of relatively rigid molded articles which can be prepared by molding the compounded polymer and then curing to cross-link and set it. However, excellent rubbers are obtained by vulcanizing mixtures of amorphous and crystalline polymers. In this case, the amount of the crystalline polymer is generally less than about 25–30% of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula:

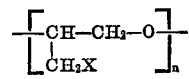

where X is halogen. In the same way, when an epihalohydrin is copolymerized with one or more other epoxides or oxetanes (including other epihalohydrins), polymerization takes place through the epoxide or oxetane linkage even though other polymerizable groups may be present. Typical of epoxides and oxetanes that can be copolymerized with an epihalohydrin to produce a copolymer that can be cross-linked in accordance with this invention, are the alkylene oxides such as ethylene oxide, propylene oxide, butene oxide, etc.; butadiene monooxide, cyclohexene oxide, vinyl cyclohexene oxide, epoxide ethers such as ethyl glycidyl ether, 2-chloroethyl glycidyl ether, hexyl glycidyl ether, allyl glycidyl ether, etc.; trimethylene oxide (oxetane), alkyl substituted oxetanes, such as 2-ethyloxetane, 3-butyloxetane, 3,3-di methyloxetane, etc.; haloalkyl substituted oxetanes such as 2 - chloromethyloxetane, 3 - iodopropyloxetane, etc.; alkoxy substituted oxetanes such as 2-ethoxyoxetane, 3-propoxyoxetane, etc.; alkoxyalkyl substituted oxetanes such as 2-butoxymethyloxetane, 3-hexoxymethyloxetane, etc.; haloalkoxy substituted oxetanes such as 2-bromobutoxyoxetane, 3-fluoromethoxyoxetane, etc., haloalkoxyalkyl substituted oxetanes such as 2-chloroethoxymethyloxetane, 3-fluoromethoxymethyloxetane, etc. The copolymers will in general contain at least about 10, preferably 25% by weight of an epihalohydrin monomer.

As pointed out above, the polymers of an epihalohydrin that are treated in accordance with this invention are high molecular weight solid polymers. Any homopolymer or copolymer that has a Reduced Specific Viscosity of at least about 0.2, i.e., a molecular weight of at least about 40,000 can be cross-linked with the agents of this invention to yield a polymer of increased tensile strength and modulus. The term "Reduced Specific Viscosity" (RSV) which is a function of molecular weight is used herein to designate the specific viscosity measured at 100° C. on an α-chloronaphthalene solution of the polymer containing 0.1 g. per 100 ml. of solution divided by the concentration of the solution. Polymers high in epifluorohydrin content are preferably determined in solutions thereof at 0.1% concentration in cyclohexanone at 50° C.

These epihalohydrin polymers generally contain a small amount (i.e., from about 0.1% to about 2% by weight) of an antioxidant added at the time of their preparation. It may in some cases be desirable to add a small additional amount of antioxidant at the time of cross-linking the polymer. Exemplary of the most preferred antioxidants are phenyl-β-naphthylamine, di-β-naphthyl-p-phenylenediamine, sym-di-β-naphthyl-p-phenylenediamine, N-isooctyl-p-aminophenol, the reaction product of diphenylamine and acetone, polymerized trimethyldihydroquinoline, nickel butyl-dithiocarbamate, 4,4′-thio-bis(6-tert-butyl-m-cresol), the reaction product of crotonaldehyde and 3-methyl-6-tert-butylphenol, etc.

As pointed out above, various polyamines can be used as cross-linking agents for epihalohydrin polymers. Exemplary of such polyamines are aliphatic amines such as ethylenediamine, propylenediamine, tetramethylenediamine, hexamethylenediamine, diethylenetriamine, etc.; aromatic amines such as p-phenylenediamine, naphthalenediamine, biphenyldiamine, etc., and polymeric amines such as poly(2-methyl-5-vinylpyridine), etc. Instead of the free amine a salt of the amine can be used. Internal salts of the amines can also be used, as for example, hexamethylenediamine carbamate, which type of salt decomposes to the free amine at or below the curing temperature. In addition to the polyamines, the epihalohydrin polymers can be cross-linked with heterocyclic compounds in combination with at least one metal compound. The heterocyclic compounds will be selected from the group consisting of 2-mercaptoimidazolines having the general formula:

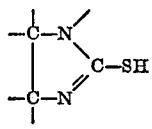

2-mercaptopyrimidines having the general formula:

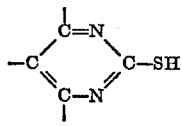

and thiazoline-2-thiones having the general formula:

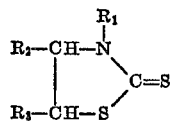

where $R_1$ is selected from the group consisting of alkyl, cycloalkyl, aryl, alkaryl, aralkyl and hydrogen radicals, and $R_2$ and $R_3$ are hydrogen or lower alkyl radicals and $R_2$ and $R_3$ may be either the same or different. The metal compound will be selected from the group consisting of salts of aromatic carboxylic acids, salts of aliphatic carboxylic acids, salts of carbonic acid, salts of phosphorus acid, salts of silicic acids and oxides of the metals of Groups II-A, II-B and IV-A of the Periodic Table (Lange's Handbook of Chemistry, 8, pages 56–57, 1952). In addition to the above cross-linking agents, urea, thiourea, and ammonia can also be used.

When cross-linking with a urea, thiourea, ammonia or polyamine, the amount employed will depend primarily upon the degree of cross-linking desired. Generally, from about 0.25% to about 10%, and preferably from about 0.5% to about 5% of the polyamines based on the weight of the polymer will be employed. When using a heterocyclic compound in combination with a metal compound to effect cross-linking, the optimum amount of each compound will again depend upon the degree of cross-linking desired. Generally, however, the amounts added (based on the weight of the polymer) will be within the following ranges: metal compound, from about 2% to about 20%; heterocyclic compound, from about 0.2% to about 10%.

Any cyclic or acyclic aliphatic quaternary ammonium halide salt or cyclic or acyclic tetraalkyl phosphonium halide salt can be used as an accelerator in accordance with this invention. These salts will have the general formula $(R)_4N^{\oplus}X^{\ominus}$, $(R)_4P^{\oplus}X^{\ominus}$ or

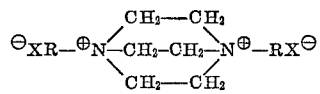

where each R individually can be the same or different cyclic or acyclic aliphatic radical and X is a halogen radical. One or more of the aliphatic radicals may be substituted with aromatic groups, just as long as each aromatic group is connected to the nitrogen atom through an aliphatic carbon atom. Exemplary of the aliphatic quaternary ammonium halide salts and tetraalkyl phosphonium halide salts which can be used in accordance with this invention are tetraethylammonium bromide, tetramethylammonium chloride, tetraethylammonium chloride, tetraethylammonium fluoride, benzyltrimethylammonium iodide, tetrapropylammonium bromide, methyltripropylammonium bromide, tetramethylammonium iodide, tetrabutylammonium chloride, triethylenediamine dimethobromide, triethylenediamine dimethoiodide, tetrapropylammonium iodide, tetraethylammonium iodide, methyltriethylammonium chloride, cyclohexyldiethylmethylammonium iodide, methyltributylphosphonium iodide, tetraethylphosphonium chloride, tetramethylphosphonium bromide and methyltripropylphosphonium fluoride. The aliphatic quaternary ammonium halide salts and tetraalkyl phosphonium halide salts produce acceleration in cross-linking when used in amounts as low as about 1 mmol per 100 grams of polymer and can be used in amounts up to about 300 mmols per 100 grams of polymer, amounts over 300 mmols per 100 grams of polymer may be undesirable.

The cross-linking agents and accelerator can be compounded or admixed with the polymer in any desired fashion. For example, they can be uniformly blended by simply milling on a conventional rubber mill or Banbury mixer. By this means the ingredients are uniformly distributed throughout the polymer and uniform cross-linking is effected when the blend is subjected to heat. It is generally preferable to mill at temperatures within the range of from about 70° F. to about 200° F., however, the blends are highly scorch-resistant below about 250° F. Other methods of compounding the ingredients with the polymer will be apparent to those skilled in the art.

The conditions under which cross-linking is effected can be varied over a wide range. In general, the cross-linking temperature will be within the range of from about 275° F. to about 400° F. The time will vary inversely with the temperature and will range from about 1 to about 120 minutes, preferably from about 5 minutes to about 45 minutes. Cross-linking will generally be conducted under pressure in a suitable press, although it can be conducted in the open without pressure.

In addition to the cross-linking agents and accelerators, other ingredients can also be incorporated. The additives commonly used in rubber vulcanization can be used here also, as for example, extenders, fillers, pigments, plasticizers, softeners, etc. The presence of a filler such as a high surface area silica or carbon black is beneficial and as in rubber compounding gives optimum results. Obviously, there are many cases in which an additive is not required or desired and excellent results are achieved when only the cross-linking agents and accelerators are added.

The following examples will illustrate the process of cross-linking epihalohydrin polymers in accordance with this invention and the vulcanizates so obtained. All parts and percentages are by weight unless otherwise indicated.

GENERAL PROCEDURE FOR PREPARATION OF VULCANIZATES

In all of the examples, polymer stocks are made up by mixing on a two-roll mill (rolls maintained at about 175° F.) one hundred parts of dry polymer with the specified cross-linking agents and accelerators and any other additives for about ten minutes. The polymer is first added to the mill and when it bands the other ingredients are added in the general order: lubricant, followed by filler, followed by antioxidant, followed by metal compound, followed by accelerator, followed by cross-linker. Where recipes indicate omissions, the order of addition is merely advanced. Unless otherwise indicated, all stocks are cross-linked in an oscillating disk rheometer (as described in ASTM D-2705-68T) at a temperature of 320° F. The extent of cross-linking is indicated by the inch-pounds of torque required to twist the sample. Completion of cross-linking is characterized by the maximum inch-pounds of torque recorded when plotted against time. Cross-linking acceleration is measured by the difference in torque at any given time, $t$, of a sample containing the accelerator as compared to a control sample without an accelerator at the same time, $t$.

Example 1

This example illustrates the acceleration in the cross-linking of polyepichlorohydrin using tetrabutylammonium bromide as the accelerator and 2-mercaptoimidazoline as the cross-linker.

A sample of polyepichlorohydrin having a molecular weight of approximately 500,000 is milled with a lubricant, carbon black, antioxidant, red lead, 2-mercaptoimidazoline and various amounts of tetrabutylammonium bromide. The amounts of the ingredients (by parts) in the formulation is tabulated below:

| Ingredients: | Parts |
|---|---|
| Polyepichlorohydrin | 100 |
| Sorbitan monostearate, lubricant | 1.0 |
| Fast extruding furnace black | 50 |
| Nickel dibutyl dithiocarbamate | 1.0 |
| Red lead | 5.0 |
| Tetrabutylammonium bromide | (1) |
| 2-mercaptoimidazoline | 1.0 |

[1] 0, 1.6, 2.1, 2.6, 3.2, 6.4.

The accelerating effect of the addition of various amounts of tetrabutylammonium bromide to the cross-linking is tabulated below:

| Amount of tetrabutyl-ammonium bromide added, phr. | Time in min. required to reach 95 inch-pounds of torque | Inch-pounds of torque at 30 min. | Δ-torque from control after 30 min. |
|---|---|---|---|
| 0 (control) | 108 | 74 | |
| 1.6 | 25 | 99 | +25 |
| 2.1 | 22 | 102 | +28 |
| 2.6 | 20 | 104 | +30 |
| 3.2 | 20 | 103 | +29 |
| 6.4 | 20 | 103 | +29 |

The above procedure is carried out omitting in one case the red lead and in another case the 2-mercaptoimidazoline. In neither case does any substantial cross-linking occur.

Example 2

This example illustrates the acceleration in the cross-linking of ethyleneoxide-epichlorohydrin copolymer using tetrabutylammonium bromide as the accelerator and 2-mercaptoimidazoline as the cross-linker.

A sample of ethyleneoxide-epichlorohydrin copolymer, containing the monomeric groups in a mol ratio of about 50:50 and having a molecular weight of approximately 1,500,000, is milled with a lubricant, carbon black, antioxidant, red lead, 2-mercaptoimidazoline and various amounts of tetrabutylammonium bromide. The amounts of the ingredients in the formulation are tabulated below:

| Ingredients: | Parts |
|---|---|
| Ethyleneoxide-epichlorohydrin copolymer | 100 |
| Sorbitan monostearate, lubricant | 1.0 |
| Fast extruding furnace black | 50 |
| Nickel dibutyl dithiocarbamate | 1.0 |
| Red lead | 5.0 |
| Tetrabutylammonium bromide | (1) |
| 2-mercaptoimidazoline | 1.5 |

[1] 0, 0.5, 1.3 and 2.0.

The accelerating effect of the addition of various amounts of tetrabutylammonium bromide to the cross-linking is tabulated below:

| Amount of tetrabutyl-ammonium bromide added, phr. | Time in min. required to reach 95 inch-pounds of torque | Inch-pounds of torque at 30 min. | Δ-torque from control after 30 min. |
|---|---|---|---|
| 0 (control) | 24 | 82 | |
| 0.5 | 19 | 87 | +5 |
| 1.3 | 17 | 91 | +9 |
| 2.0 | 14 | 97 | +15 |

Example 3

This example illustrates the acceleration in the cross-linking of polyepichlorohydrin using tetrabutylammonium iodide as the accelerator.

A sample of polyepichlorohydrin having a molecular weight of approximately 500,000 is milled with a lubricant, carbon black, antioxidant, red lead, 2-mercaptoimidazoline, and tetrabutylammonium iodide. The amounts of the ingredients in the formulation are tabulated below:

| Ingredients: | Parts |
|---|---|
| Polyepichlorohydrin | 100 |
| Sorbitan monostearate, lubricant | 1.0 |
| Fast extruding furnace black | 50 |
| Nickel dibutyl dithiocarbamate | 1.0 |
| Red lead | 5.0 |
| Tetrabutylammonium iodide | 0.5 |
| 2-mercaptoimidazoline | 1.0 |

[1] 0, 0.5, 1.3 and 2.0.

A control sample is prepared without any tetrabutylammonium iodide.

The accelerating effect of the addition of tetrabutylammonium iodide to the cross-linking is tabulated below:

| Amount of tetra-butylammonium iodine added, phr. | Inch-pounds torque at 30 min. | Δ-torque from control after 30 min. |
|---|---|---|
| 0 (control) | 68 | |
| 0.5 | 93 | +25 |

Examples 4-8

These examples illustrate the acceleration in the cross-linking of polyepichlorohydrin using various aliphatic quaternary ammonium halide salts as accelerators.

Samples of polyepichlorohydrin having a molecular weight of approximately 500,000 are milled with a lubricant, carbon black, antioxidant, red lead, 2-mercaptoimidazoline, and various aliphatic ammonium halide salts. The amounts of the ingredients in each formulation are tabulated in Table I below:

TABLE I

| Ingredients | Control | 4 | 5 | 6 | 7 | 8 |
|---|---|---|---|---|---|---|
| Polyepichlorohydrin | 100 | 100 | 100 | 100 | 100 | 100 |
| Sorbitan monostearate, lubricant | 1.0 | 1.0 | 1.0 | 1.0 | 1.0 | 1.0 |
| Fast extruding furnace black | 50 | 50 | 50 | 50 | 50 | 50 |
| Nickel dibutyl dithiocarbamate | 1.0 | 1.0 | 1.0 | 1.0 | 1.0 | 1.0 |
| Red lead | 5.0 | 5.0 | 5.0 | 5.0 | 5.0 | 5.0 |
| 2-mercaptoimidazoline | 1.0 | 1.0 | 1.0 | 1.0 | 1.0 | 1.0 |
| Triethylenediamine dimethobromide | | 1.0 | | | | |
| Triethylenediamine dimethoiodide | | | 1.5 | | | |
| Benzyltrimethylammonium iodide | | | | 2.6 | | |
| Tetramethylammonium iodide | | | | | 2.0 | |
| Tetrabutylammonium chloride | | | | | | 2.8 |

The accelerating effect of the addition of the various quaternary ammonium salts to the cross-linking is tabulated in Table II below:

TABLE II

| Example | Quaternary ammonium salt | Inch-pounds of torque at 30 min. | Δ-torque from control after 30 min. |
|---|---|---|---|
| Control | | 73 | |
| 4 | Triethylenediamine dimethobromide | 84 | +11 |
| 5 | Triethylenediamine dimethoiodide | 83 | +10 |
| 6 | Benzyltrimethylammonium iodide | 93 | +20 |
| 7 | Tetramethylammonium iodide | 85 | +12 |
| 8 | Tetrabutylammonium chloride | 96 | +23 |

Examples 9 and 10

These examples illustrate the acceleration in the cross-linking of polyepichlorohydrin using tetraethylammonium bromide and fluoride as accelerators and 2-mercaptoimidazoline as the cross-linker.

A sample of polyepichlorohydrin having a molecular weight of approximately 500,000 is milled with the same ingredients and in the same amounts as described in Examples 4-8 with the exception that in place of the quaternary ammonium halide salts recited there, 4 parts of tetraethylammonium bromide is substituted in Examples 9 and 3 parts of tetraethylammonium fluoride is substituted in Example 10.

The accelerating effect of the addition of the tetraethylammonium halide salts to the cross-linking is tabulated below:

| Example | Tetraethyl-ammoniumhalide salt added | Amount of tetraethyl-ammonium halide salt added, phr. | Inch-pounds of torque at 30 min. | Δ-torque from control after 30 min. |
|---|---|---|---|---|
| Control | | | 88 | |
| 9 | Tetraethylammonium bromide | 4.0 | 126 | +38 |
| 10 | Tetraethylammonium fluoride | 3.0 | 95 | +7 |

Example 11

This example illustrates the acceleration of the cross-linking of polyepichlorohydrin using a cyclic aliphatic ammonium halide salt as the accelerator and 2-mercaptoimidazoline as the cross-linker.

The procedure of Examples 9 and 10 is repeated with the exception that six parts per hundred of cyclohexyldiethylmethylammonium iodide is substituted for the tetraethylammonium halide salts. After 15 minutes of curing, the inch-pounds of torque was 75 as compared to 65 for a standard control.

Example 12

This example illustrates the acceleration in the cross-linking of polyepichlorohydrin using tetrabutylammonium bromide as the accelerator and hexamethylenediamine carbamate as the cross-linker.

A sample of polyepichlorohydrin having a molecular weight of approximately 500,000 is milled with a lubricant, carbon black, antioxidant, red lead, hexamethylenediamine carbamate and tetrabutylammonium bromide. The amounts of the ingredients in the formulation is tabulated below.

Ingredients: Parts
Polyepichlorohydrin _____ 100
Sorbitan monostearate, lubricant _____ 1.0
Fast extruding furnace black _____ 50
Nickel dibutyl dithiocarbamate _____ 1.0
Red lead _____ 5.0
Tetrabutylammonium bromide _____ 0, 3.2
Hexamethylenediamine carbamate _____ 1.2

The accelerating effect of the addition of the tetrabutylammonium bromide to the cross-linking is tabulated below:

| Amount of tetrabutyl-ammonium bromide added, phr. | Inch-pounds of torque at 30 min. | Δ-torque from control after 30 min. |
|---|---|---|
| 0 (control) | 107 | |
| 3.2 | 125 | +18 |

Example 13

This example illustrates the acceleration in the cross-linking of polyepichlorohydrin using tetrabutylammonium bromide as the accelerator and p-phenylenediamine as the cross-linker.

A sample of polyepichlorohydrin having a molecular weight of approximately 500,000 is milled with the same ingredients in the same amounts as described in Example 12 with the exception that 1.05 parts of p-phenylenediamine is substituted for the hexamethylenediamine carbamate.

The accelerating effect of the addition of the tetrabutylammonium bromide to the cross-linking is tabulated below:

| Amount of tetrabutyl-ammonium bromide added, phr. | Inch-pounds of torque at 30 min. | Δ-torque from control after 30 min. |
|---|---|---|
| 0 (control) | 120 | |
| 3.2 | 140 | +20 |

Example 14

This example illustrates the acceleration in the cross-linking of polyepichlorohydrin using methyl tributylphosphonium iodide as the accelerator and 2-mercaptoimidazoline as the cross-linker.

A sample of polyepichlorohydrin having a molecular weight of approximately 500,000 is milled with a lubricant, carbon black, antioxidant, red lead, 2-mercaptoimidazoline, and methyl tributylphosphonium iodide. The amounts of the ingredients in the formulation are tabulated below:

Ingredients: Parts
Polyepichlorohydrin _____ 100
Sorbitan monostearate, lubricant _____ 1.0
Fast extruding furnace black _____ 50
Nickel dibutyl dithiocarbamate _____ 1.0
Red lead _____ 5.0
Methyl tributylphosphonium iodide _____ 6.85
2-mercaptoimidazoline _____ 1.0

A control sample is prepared without any methyl tributylphosphonium iodide.

The accelerating effect of the addition of methyl tributylphosphonium iodide to the cross-linking is tabulated below:

| Amount of methyl tributylphosphonium iodide added, phr. | Inch-pounds of torque at 30 min. | Δ-torque from control after 30 min. |
|---|---|---|
| 0 (control) | 88 | |
| 6.85 | 141 | +53 |

Examples 15-19

These examples illustrate the acceleration in the cross-linking of polyepichlorohydrin using tetrabutylammonium bromide as the accelerator and various cross-linking agents.

Samples of polyepichlorohydrin having a molecular weight of approximately 500,000 are milled with a lubricant, carbon black, antioxidant, red lead, various cross-linking agents and tetrabutylammonium bromide. Control samples are prepared exactly the same way except for the omission of tetrabutylammonium bromide. The amounts of the ingredients in each formulation are tabulated in Table III below:

TABLE III

| Ingredients | Urea control | 15 | Thiourea control | 16 | Guanidine control | 17 | Mercaptopyrimidine control | 18 | Thiazoline control | 19 |
|---|---|---|---|---|---|---|---|---|---|---|
| Polyepichlorohydrin | 100 | 100 | 100 | 100 | 100 | 100 | 100 | 100 | 100 | 100 |
| Sorbitan monostearate, lubricant | 1.0 | 1.0 | 1.0 | 1.0 | 1.0 | 1.0 | 1.0 | 1.0 | 1.0 | 1.0 |
| Fast extruding furnace black | 50 | 50 | 50 | 50 | 50 | 50 | 50 | 50 | 50 | 50 |
| Nickel dibutyl dithiocarbamate | 1.0 | 1.0 | 1.0 | 1.0 | 1.0 | 1.0 | 1.0 | 1.0 | 1.0 | 1.0 |
| Red lead | 5.0 | 5.0 | 5.0 | 5.0 | 5.0 | 5.0 | 5.0 | 5.0 | 5.0 | 5.0 |
| Urea | 0.64 | 0.64 | | | | | | | | |
| Thiourea | | | 0.76 | 0.76 | | | | | | |
| Guanidine hydrochloride | | | | | 1.19 | 1.19 | | | | |
| 2-mercaptopyrimidine | | | | | | | 2.0 | 2.0 | | |
| Thiazoline-2-thione | | | | | | | | | 2.5 | 2.5 |
| Tetrabutylammonium bromide | | 3.2 | | 3.2 | | 3.2 | | 3.2 | | 3.2 |

The accelerating effect of the addition of the tetrabutylammonium bromide is tabulated in Table IV below:

TABLE IV

| Example | Cross-linking agent | Inch-pounds of torque at 30 min. | Δ-torque from control after 30 min. |
|---|---|---|---|
| Control | Urea | 32 | |
| 15 | do | 66 | +34 |
| Control | Thiourea | 30 | |
| 16 | do | 97 | +67 |
| Control | Guanidine hydrochloride | 35 | |
| 17 | do | 80 | +45 |
| Control | 2-mercaptopyrimidine | 74 | |
| 18 | do | 100 | +26 |
| Control | Thiazoline-2-thione | 60 | |
| 19 | do | 91 | +31 |

Example 20

This example illustrates the acceleration in the cross-linking of ethyleneoxide-epichlorohydrin copolymer using tetrabutylammonium bromide as the accelerator and ammonium carbonate as the cross-linker.

A sample of ethyleneoxide-epichlorohydrin copolymer, containing the monomeric groups in a mol ratio of about 50:50 and having a molecular weight of approximately 1,500,000, is milled with a lubricant, carbon black, antioxidant, red lead, ammonium carbonate and tetrabutylammonium bromide. The amounts of the ingredients in the formulation are tabulated below:

Ingredients: Parts
Ethyleneoxide-epichlorohydrin copolymer ____ 100
Sorbitan monostearate, lubricant _____ 1.0
Fast extruding furnace black _____ 50
Nickel dibutyl dithiocarbamate _____ 1.0
Red lead _____ 5.0
Tetrabutylammonium bromide _____ 0 and 3.2
Ammonium carbonate _____ 0.78

The accelerating effect of the addition of tetrabutylammonium bromide to the cross-linking is tabulated below:

| Amount of tetrabutylammonium bromide added, phr. | Inch-pounds of torque at 15 min. | Δ-torque from control after 15 min. |
|---|---|---|
| 0 (control) | 67 | |
| 0.78 | 77.5 | +10.5 |

What we claim and desire to protect by Letters Patent is:
1. In the process of cross-linking a polymer of epihalohydrin which comprises heating said polymer in admixture with a cross-linking agent selected from the group consisting of urea, thiourea, ammonia, ammonium salts, polyamines, hydrogen halide salts of polyamines, polyamine carbamates and a combination of at least one metal compound selected from the salts of aromatic carboxylic acids, salts of aliphatic carboxylic acids, salts of carbonic acid, salts of phosphorous acid, salts of silicic acid and oxides of metals of Groups II-A, II-B and IV-A of the Periodic Table and an agent selected from the group consisting of 2-mercaptoimidazolines, 2-mercaptopyrimidines and thiazoline-2-thiones, the improvement of compounding said polymer with from about 1.0 to about 300 mmol per 100 grams of polymer of an accelerator selected from the group consisting of tetraalkyl phosphonium halide salts having the general formula $(R)_4P^\oplus X^\ominus$ and aliphatic quaternary ammonium halide salts having the general formula $(R)_4^\oplus X^\ominus$ or

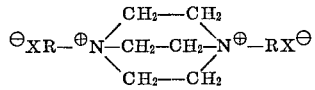

where each R individually is selected from the group consisting of cyclic and acyclic aliphatic radicals and X is a halogen radical.

2. The process of claim 1 wherein the accelerator is said aliphatic quaternary ammonium halide salt.
3. The process of claim 2 wherein the aliphatic quaternary ammonium halide salt is tetrabutylammonium bromide.
4. The process of claim 1 wherein the accelerator is said tetraalkyl phosphonium halide salt.
5. The process of claim 4 wherein the tetraalkyl phosphonium halide salt is methyl tributylphosphonium iodide.
6. The process of claim 1 wherein the polymer of epihalohydrin is polyepichlorohydrin.
7. The process of claim 1 wherein the polymer of epihalohydrin is a copolymer of epichlorohydrin and ethylene oxide.
8. The process of claim 1 wherein the cross-linking agent is a combination of 2-mercaptoimidazoline and a lead oxide.

References Cited
UNITED STATES PATENTS
3,341,491   9/1967   Robinson et al. ____ 260—45.75

DONALD E. CZAJA, Primary Examiner
M. I. MARQUIS, Assistant Examiner

U.S. Cl. X.R.
260—2 A, 18 PN, 18 PT, 37 EP, 45.75 N